United States Patent [19]

Yasui

[11] Patent Number: 5,141,146

[45] Date of Patent: Aug. 25, 1992

[54] FABRICATION OF SUPERPLASTICALLY FORMED TRUSSCORE STRUCTURE

[75] Inventor: Ken K. Yasui, Huntington Beach, Calif.

[73] Assignee: McDonnell Douglas Corporation, Long Beach, Calif.

[21] Appl. No.: 711,209

[22] Filed: Jun. 6, 1991

[51] Int. Cl.$^5$ .................. B23K 11/06; B23K 20/14; B23K 101/04; B21D 26/02
[52] U.S. Cl. ..................... 228/157; 228/193; 29/6.1; 29/890.042; 29/897.1
[58] Field of Search ............. 228/196, 157, 173.6, 228/234, 190, 175, 183, 185, 186, 193; 52/675, 807, 816, 785, 670, 671; 29/889.72, 89.721, 889.722, 890.039, 897.32, 6.1, 890.042, 897.1, 897.31; 428/593

[56] References Cited

U.S. PATENT DOCUMENTS

| | | | |
|---|---|---|---|
| 2,957,679 | 10/1960 | Campbell | 29/890.039 |
| 3,067,492 | 12/1962 | Johnson | 29/890.042 |
| 3,535,761 | 10/1970 | Michelson et al. | 29/890.042 |
| 4,304,821 | 12/1981 | Hayase et al. | 228/157 |
| 4,406,393 | 9/1983 | Ascani, Jr. et al. | 228/157 |
| 4,530,197 | 7/1985 | Rainville | 228/157 |
| 4,549,685 | 10/1985 | Paez | 228/193 |
| 4,588,651 | 5/1986 | Israeli | 228/157 |
| 4,603,460 | 8/1986 | Yano et al. | 228/183 |
| 4,916,027 | 4/1990 | DelMundo | 428/593 |

FOREIGN PATENT DOCUMENTS 614378 2/1961 Canada ............. 29/890.042
218342 11/1961 Fed. Rep. of Germany ......... 29/6.1
1407730 7/1988 U.S.S.R. ............. 228/193

Primary Examiner—Richard K. Seidel
Assistant Examiner—Jeanne M. Elpel
Attorney, Agent, or Firm—Max Geldin

[57] ABSTRACT

Process for fabricating a superplastically formed trusscore structure from a pair of core elements each formed of a pair of metal sheets of a superplastic material, e.g. titanium. The sheets of each core element are welded together along pairs of closely spaced weld lines, one core element having an even number and the other core element an odd number of such pairs of parallel weld lines. A slot is provided between the weld lines of each pair of weld lines. The two core elements are placed together, with the pairs of weld lines of one core element displaced laterally, preferably midway between the pairs of weld lines of the other core element. Face sheets are applied in contact with the outer sheet of each of the core elements, and the periphery of the assembly is sealed as by welding. The resulting forming pack asssembly is placed in the cavity of a forming die. The die is heated to a temperature suitable for superplastic forming, and gas pressure is applied between the sheets of each core element and in the space between each of the face sheets, forming a plurality of successive substantially similar trapezoids. Additional pressure is then applied sufficient to cause diffusion bonding of adjacent contacting non-parallel sides of the trapezoids, and of adjacent contacting top and bottom surfaces of the trapezoids and the face sheets.

13 Claims, 2 Drawing Sheets

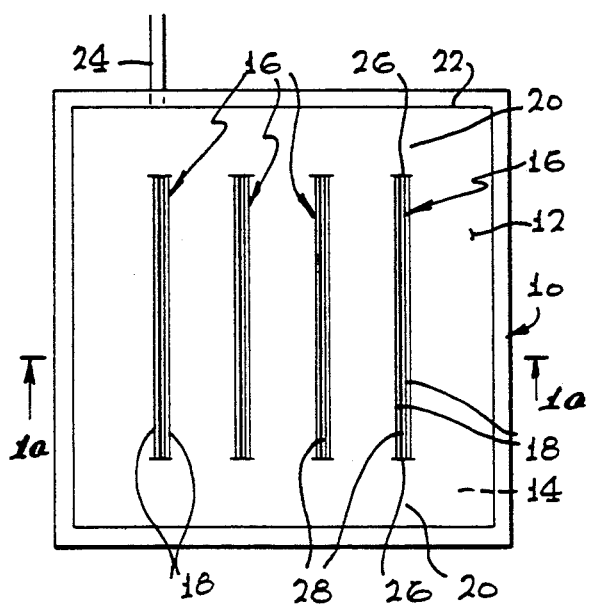
FIG. 1
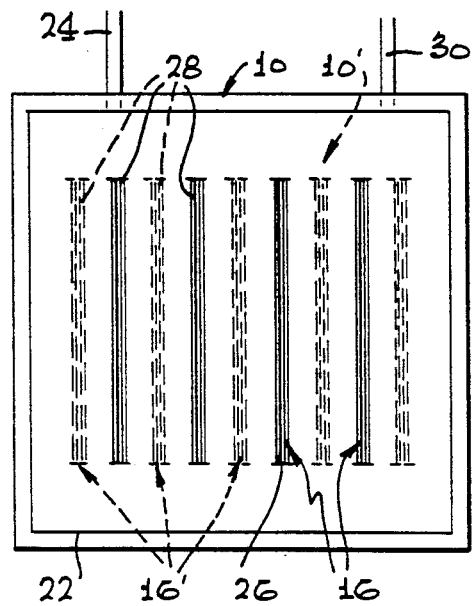
FIG. 2
FIG. 1a
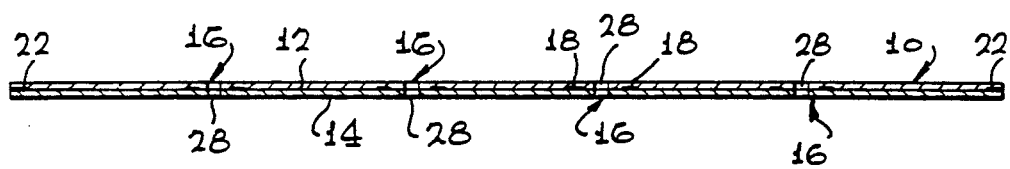
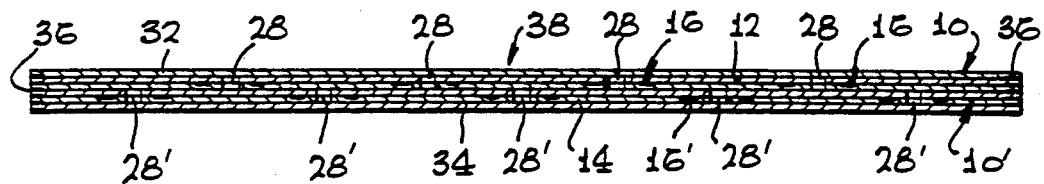
FIG. 3

FABRICATION OF SUPERPLASTICALLY FORMED TRUSSCORE STRUCTURE

BACKGROUND OF THE INVENTION

This invention relates to the production of superplastically formed metal alloy panel structures, and is more particularly directed to novel procedure for the production of a superplastically formed and diffusion bonded trusscore structure, and to the resulting improved structure.

Superplasticity is the characteristic demonstrated by certain metals to develop unusually high tensile elongations with minimum necking when deformed within a limited temperature and strain rate range. This characteristic, peculiar to certain metal and metal alloys has been known in the art as applied to the production of complex shapes. It is further known that at these same superplastic forming temperatures the same materials can be diffusion bonded with the application of pressure at contacting surfaces.

Diffusion bonding refers to the solid-state, metallurgical joining of surfaces of similar or dissimilar metals by applying heat and pressure for a time duration so as to effect intimate surface contact and cause comingling of atoms at the joint interface.

U. S. Pat. No. 4,304,821 to Hayase, et al discloses the structure and the process for making a metallic sandwich structure or box section panel in which metal worksheets, preferably made from titanium alloy, are joined in a preselected pattern by an intermittent or discontinuous weld. The joined sheets are sealed by a continuous weld to form an expandable envelope. Application of inert gas pressure to the envelope in a limiting fixture superplastically produces the sandwich structure as the expanded structure diffusion bonds to itself or other worksheets. Core configuration of the structure is determined by the weld pattern.

In some panel structure configurations, during superplastic forming of the core sheets the thinning is not consistent over the entire core sheet areas, some areas thinning out more quickly than other areas. Under these conditions when starting with a thick material, following superplastic forming, the resulting structure will have certain areas that are very thin and other areas that are very thick, resulting in a weight penalty where it is desired to form a completed structure in which the thin areas have a predetermined thickness. Also, in many instances for production of panel structures including trusscore structures, long and complex superplastic forming cycles are required, increasing the cost of production. Also, in some processes it is difficult to employ materials having relatively low super plasticity such as aluminum.

It is an object of the invention to provide an improved trusscore structure.

Another object of the present invention is to provide a novel process for producing a trusscore structure by superplastic forming and diffusion bonding.

Another object is the provision of procedure for producing a trusscore structure using simple and short forming cycles.

A further object is to provide a process of the above type, enabling the use of materials having less superplasticity such as aluminum.

Yet another object is the provision of a process for fabricating trusscore structures by superplastic forming so as to result in substantially uniform thinning over the superplastically formed areas of the structure.

Other objects and advantages will appear hereinafter.

SUMMARY OF THE INVENTION

The present invention provides a method for producing a metallic trusscore structure from a pair of metal core elements comprised of superplastic material. By the term "superplastic material" employed herein is meant materials having the aforementioned superplasticity characteristics.

Each core element is formed of a pair of metal sheets, each of the sheets comprised of a superplastic material. The sheets are welded together along a plurality of pairs of spaced parallel weld lines, leaving space to permit free passage of gas between the sheets throughout the core element. Preferably one core element has an odd number and the other an even number of pairs of parallel weld lines. A slot is provided between the weld lines of each of the pairs of parallel weld lines.

The two core elements are then assembled in face to face contact, with the pairs of weld lines in each of the core elements in parallel relation, and the pairs of weld lines in one core element displaced laterally from the pairs of weld lines of the other core element. Two face sheets are placed in contact with the outer sheet of the respective core elements, and the resulting assembly of core elements and face sheets is sealed around the periphery as by welding. Gas inlets are provided for admission of pressurized gas between the sheets of the core elements and in the space between the face sheets and the outer sheets of each of the core elements.

The resulting forming pack assembly is inserted in the cavity of a forming die, having upper and lower walls. The die is heated to a temperature suitable for superplastic forming and gas pressure is applied at the gas inlets, causing superplastic forming and expansion of the sheets of each of the core elements, in the areas between adjacent pairs of weld lines. Pressure is applied between the face sheets and the adjacent core elements to maintain the face sheets in contact with the walls of the die cavity during superplastic forming.

Pressure is continued to be applied to cause further expansion of the sheets of each core element and formation of a plurality of successive substantially similar trapezoids having a pair of non-parallel sides from the expanded core sheets of the core elements between the face sheets, adjacent trapezoids being in contact with each other and with the face sheets. Pressure is then applied sufficient for diffusion bonding adjacent contacting surfaces of the trapezoids, and the contacting surfaces of the trapezoids and the face sheets.

The result is an improved high strength trusscore of substantially uniform core thickness over the entire structure. The structure is produced by a simple short forming cycle of reduced cost, and the trusscore structure of the invention can be formed from metals having low superplasticity such as aluminum, as well as metals having high superplasticity such as titanium and its alloys.

BRIEF DESCRIPTION OF THE DRAWINGS

FIG. 1 is a plan view of a core element formed of a pair of superplastic metal sheets welded together along a series of pairs of spaced parallel weld lines, with a slot between each pair of weld lines;

FIG. 1a is a section taken on line 1a—1a of FIG. 1;

FIG. 2 is a plan view showing two of the core elements of FIG. 1 joined together, with the pairs of weld lines in one core element displaced laterally from the pairs of weld lines of the other core element;

FIG. 3 is a cross section of the assembly of FIG. 2 and also including face sheets in contact with the outer sheet of each of the upper and lower core elements;

DETAILED DESCRIPTION OF THE INVENTION AND PREFERRED EMBODIMENTS

Figure 4:
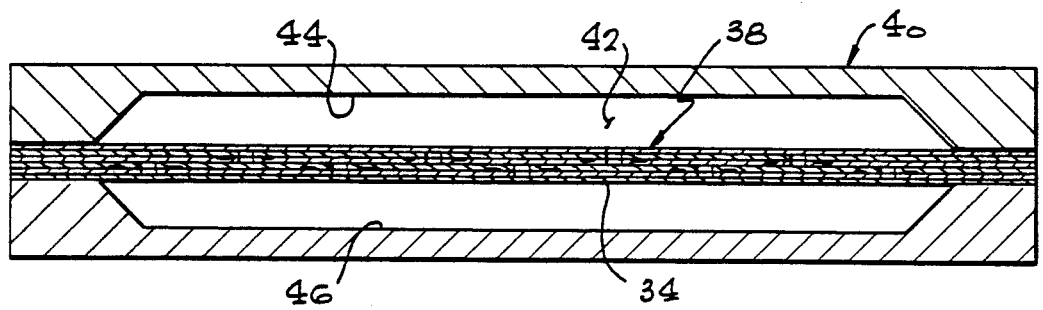
FIG. 4 is a cross-section of a die containing the assembly of FIG. 3.

As indicated above, the material to be superplastically formed must exhibit the characteristic of unusually high tensile elongation with minimum necking when deformed within a limited temperature and strain rate range. While several materials demonstrate these superplastic properties, titanium and its alloys are currently the best known superplastic forming materials. Examples of other metals which have superplasticity characteristics include zirconium, refractory metals, and alloys thereof. While aluminum has lower superplasticity characteristics, it can nevertheless be employed as sheet materials in the invention process. The superplastic temperature range varies with the specific alloy used. This temperature for titanium alloys is near 1700° F., and for aluminum is about 900° F.

In addition to the superplastic properties, the sheet material to be formed according to the invention must be suitable for diffusion bonding. Diffusion bonding temperatures can vary from 1450° F. to about 1850° F., e.g. about 1700° F. for 6Al-4V titanium alloy, and bonding pressure can vary from 100 psi to about 2,000 psi or more, usually from 150 to about 600 psi.

Sandwich panels or panel structures according to the invention are constructed by combining a pair of core elements. Referring to FIGS. 1, 1a and 2 of the drawing, the core elements 10 and 10' are each constructed of two superplastic metallic sheets 12 and 14. The sheets 12 and 14 of core element 10 are welded together along an even number, here shown as four, pairs 16 of spaced parallel weld lines 18, leaving sufficient space to create gas passages at the ends of the welds, as at 20, to permit uniform passage of gas to balance the gas pressure between the metal sheets of the core element during the forming process can be employed. The two metallic sheets 12 and 14 are also welded as by a continuous seam weld at 22 around the periphery of the sheets, leaving a gas inlet at 24 to the space between sheets 12 and 14. Each pair of weld lines 18 are closely spaced, e.g. about ⅛ inch between them, and the weld lines 18 of each pair of weld lines are of substantially the same length, and they are connected as by roll seam welding at 26 at both ends of the parallel weld lines 18. It is seen that the distance between the pairs 16 of weld lines 18, is substantially greater than the distance between the weld lines 18 of each pair of such weld lines. The core element 10 is provided with a slot 28 midway between the adjacent weld lines 18, the slot 28 being cut completely through each of the sheets 12 and 14. The slots extend parallel to weld lines 18 of each pair 16 of such weld lines and are positioned between weld lines 18, approximately midway between such weld lines and extend for a length just short of the length of weld lines 18, to the end welds 26. Slots 28 do not extend across the end welds 26.

The other core element 10', as seen in FIGS. 2 and 3 is of the same construction as core element 10, except that core element 10' has an odd number, here shown as five, pairs of weld lines, designated 16'. The distance between the pairs of weld lines 16' of core element 10' is the same as the distance between the pairs of weld lines 16 of core element 10. The core element 10' has a gas inlet 30 to the space between sheets 12 and 14 of core element 10'.

The two core elements 10 and 10' are placed together, core element 10 over core element 10'. It will be noted that in this position, the pairs of weld lines 16 and 16' in both of the core elements are parallel, and the pairs of weld lines 16' in core element 10' are displaced or stasggered laterally from the pairs of weld lines 16 in core element 10. More specifically, according to preferred practice, the pairs of weld lines 16', as well as the slots 28', of the lower core element 10', are positioned midway between the pairs of weld lines 16 and slots 28 of the upper core element 10.

A face sheet 32 is then placed in contact with the outer sheet 12 of the upper core element 10 and a face sheet 34 is placed in contact with the outer sheet 14 of the lower core element 10'. The resulting assembly as shown in FIG. 3 is then sealed around the periphery, as by fusion welding at 36. Gas inlets (not shown) are provided for introduction of pressurized gas into the space between each of the face sheets 32 and 34 and the respective adjacent outer sheets 12 and 14 of core elements 10 and 10'.

Figure 5:
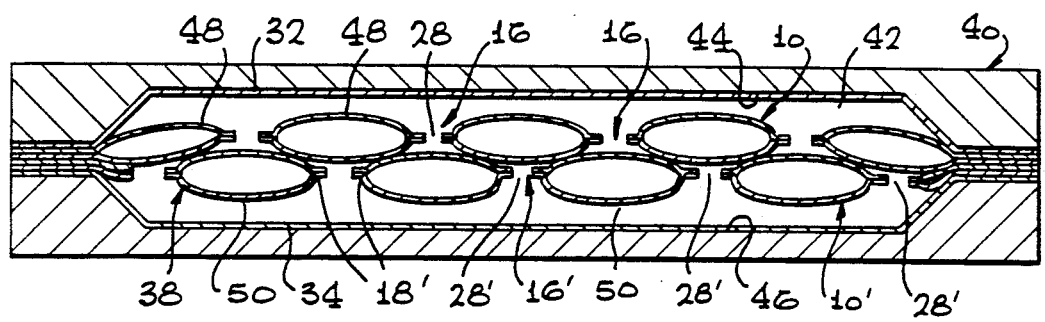
FIG. 5 is a cross-section of the partially superplastically formed assembly of FIG. 3.

The resulting forming pack assembly 38 is placed in the cavity 42 of a forming die 40, as seen in FIG. 4, having walls 44 and 46. The die is heated to a temperature suitable for superplastic forming. Gas pressure is applied to the spaces between the face sheets 32 and 34 and the adjacent outer sheets 12 and 14 of core elements 10 and 10', respectively, to cause superplastic forming and expansion of face sheets 32 and 34 into contact with walls 44 and 46 of die cavity 42, as seen in FIG. 5. Gas pressure is also applied through gas inlets 24 and 30 into the interior of core elements 10 and 10', between adjacent sheets 12 and 14 thereof, causing superplastic forming and expansion of sheets 12 and 14 of both core elements, between adjacent pairs 16 of weld lines of core element 10 and between adjacent pairs 16' of weld lines of core element 10'. In the partially expanded condition of the forming pack assembly 38 as shown in FIG. 5, there are formed a top series of bulges 48 between adjacent pairs of weld lines 16 of top core element 10 and a second series of bulges 50 between adjacent pairs of weld lines 16' of bottom core element 10'. The bulges 50 of core element 10' are displaced laterally from the bulges 48 of core element 10. The bulges 50 are disposed symmetrically between the bulges 48, with the bulges 48 positioned opposite the slots 28' in core element 10', and the bulges 50 positioned opposite the slots 28 in core element 10. It is noted that during this period of superplastic forming and expansion the width of slots 28 and 28' of core elements 10 and 10', between adjacent bulges 48 and between bulges 50, widened. It is also noted that bulges 48 make contact with adjacent bulges 50.

Figure 6:
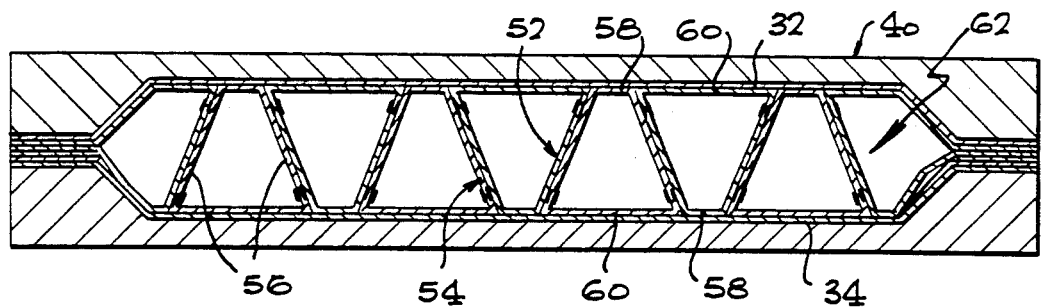
FIG. 6 is a cross-section of the final superplastically formed trusscore structure in the die.

While applying sufficient gas pressure in the space between each of the face sheets 32 and 34, and the respective adjacent outer sheets 12 and 14 of core elements 10 and 10' to maintain the face sheets 32 and 34 in contact with the walls 44 and 46 of die cavity 42, increasing gas pressure is continued to be applied through gas inlets 24 and 30, causing further superplastic forming and expansion of the bulges 48 and 50 of core elements 10 and 10'. As seen in FIG. 6, this results in formation of a first series of substantially similar trapezoids 52 from core element 10 between face sheets 32 and 34, and a second series of substantially similar trapezoids 54 from core element 10' between the face sheets, the trapezoids 52 and 54 each having a pair of non-parallel sides 56. Trapezoids 52 and 54 have the same shape, and trapezoids 52 are inverted with respect to trapezoids 54, and nest between each other, and the sides of trapezoids 52 are in contact with the sides of adjacent trapezoids 54, the parallel top 58 and bottom 60 of each of the trapezoids being in contact with face sheets 32 and 34.

Figure 7:
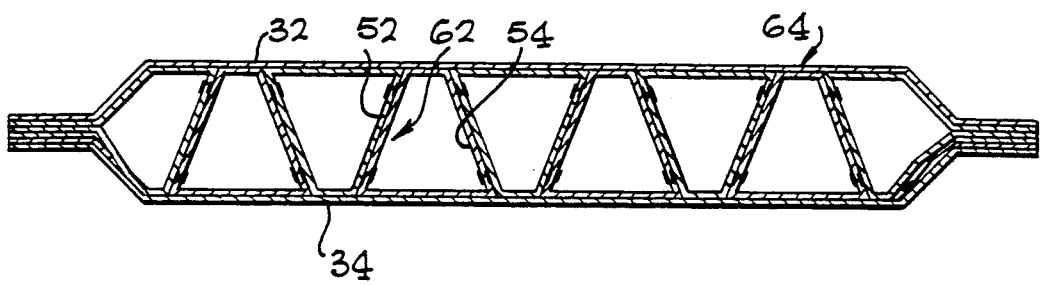
FIG. 7 shows the final trusscore structure.

During such contacting and formation of the trapezoids 52 and 54, the pressure is increased to diffusion bonding pressure, e.g. 200 psi, and under the heat and pressure applied to the interior of core elements 10 and 10', the contacting sides of trapezoids 52 and 54 become diffusion bonded to each other, and the contacting top and bottom of trapezoids 52 and 54 and the adjacent contacting areas of face sheets 32 and 34 become diffusion bonded forming the core sheet or web 62 between face sheets 32 and 34. The resulting trusscore structure 64 removed from the forming die 40 is shown in FIG. 7.

The trusscore structure produced according to the invention process can be employed as a structural component in various applications, and particularly in aerospace vehicles.

From the foregoing, it is seen that an improved light weight trusscore structure of substantially uniform thickness throughout the core can be produced from sheets of superplastic material by a simple short superplastic forming and diffusion bonding cycle.

Since various changes and modifications of the invention will occur to those skilled in the art within the spirit of the invention, the invention is not to be taken as limited except by the scope of the appended claims.

What is claimed is:

1. A process for producing a superplastically formed trusscore structure which comprises
   providing first and second core elements, each of said elements formed of a pair of metal sheets, each comprised of a superplastic material, said sheets being welded together along a plurality of pairs of spaced parallel weld lines, leaving space to permit free passage of gas between the sheets throughout the core element,
   providing a slot between the weld lines of each of said pairs of weld lines,
   placing said core elements together in face to face contact, with the pairs of weld lines in each of said core elements in parallel relation and the pairs of weld lines in said second core element displaced laterally from the pairs of weld lines of said first core panel,
   applying a first face sheet in contact with the outer sheet of said first core element, and a second face sheet in contact with the outer sheet of said second core element,
   sealing the perimeter of the resulting assembly of core elements and face sheets, while providing means for the admission of pressurized gas between the sheets of said core elements and in the space between each of said face sheets and the respective adjacent outer sheets of said first and second core elements,
   providing a forming die having opposing upper and lower walls and defining a cavity therebetween,
   placing the resulting assembly of sealed core elements and face sheets in said cavity, and
   heating said last mentioned assembly to a temperature suitable for superplastic forming and applying gas pressure at said means for admission of pressurized gas, causing superplastic forming and expansion of said sheets of each such core elements, between adjacent pairs of weld lines and expansion of said face sheets into contact with the walls of said cavity,
   continuing to apply said pressurized gas to cause further expansion of said sheets of each core element and formation of a plurality of successive substantially similar trapezoids having a pair of non-parallel sides from the expanded core sheets of said first and second core elements between said face sheets, adjacent trapezoids being in contact with each other and with said face sheets, and
   applying pressure sufficient for diffusion bonding adjacent contacting surfaces of said trapezoids, and the contacting surfaces of said trapezoids and said face sheets.

2. The process of claim 1, the weld lines of each of said pairs of weld lines being closely spaced and of substantially the same length, the distance between the pairs of weld lines being substantially greater than the distance between the weld lines of each of said pairs of weld lines.

3. The process of claim 2, each of said pairs of weld lines being connected at their adjacent ends by end welds.

4. The process of claim 3, said weld lines being roll seam welds, and said sheets of each of said core elements being further connected by a peripheral weld.

5. The process of claim 3, said slots extending entirely through both of the sheets of said pair of sheets and extending parallel to the weld lines of each pair of weld lines and approximately midway therebetween, said slots extending for a length just short of the length of said pair of weld lines, but without extending across said end welds.

6. The process of claim 1, one of said core elements having an even number of said plurality of pairs of spaced parallel weld lines and the other core element an odd number of said plurality of pairs of spaced parallel weld lines.

7. The process of claim 6, wherein the pairs of weld lines in both of said core elements are parallel and each pair of the pairs of weld lines in one of said core elements is positioned approximately midway between adjacent pairs of weld lines in the other core element.

8. The process of claim 1, including applying sufficient gas pressure in the space between each of said face sheets and the respective adjacent outer sheets of said core elements to maintain said face sheets in contact with the walls of said die cavity during superplastic forming of said sheets of each of said core elements.

9. The process of claim 1, the superplastic forming and expansion of said sheets of said core elements first forming bulges between adjacent pairs of weld lines, said bulges of one core element being displaced laterally from the bulges of the other core element, the bulges of one core element being disposed opposite the slots of the other core element.

10. The process of claim 5, one of said core elements having an even number of said plurality of pairs of spaced parallel weld lines and the other core element an odd number of said plurality of pairs of spaced parallel weld lines, and wherein the pairs of weld lines in both of said core elements are parallel and each pair of the pairs of weld lines in one of said core elements is positioned approximately midway between adjacent pairs of weld lines in the other core element.

11. The process of claim 8, the superplastic forming and expansion of said sheets of said core elements first forming bulges between adjacent pairs of weld lines, said bulges of one core element being displaced laterally midway from the bulges of the other core element, the bulges of one core element being disposed opposite the slots of the other core element.

12. The process of claim 10, including applying sufficient gas pressure in the space between each of said face sheets and the respective adjacent outer sheets of said core elements to maintain said face sheets in contact with the walls of said die cavity during superplastic forming of said sheets of each of said core elements, the superplastic forming and expansion of said sheets of said core elements first forming bulges between adjacent pairs of weld lines, said bulges of one core element being displaced laterally from the bulges of the other core element, the bulges of one core element being disposed opposite the slots of the other core element.

13. The process of claim 1, wherein the trapezoids formed from said second core element are inverted with respect to the trapezoids formed from said first core element, and nest between each other, the non-parallel sides of said trapezoids being in contact with and diffusion bonded to each other, and the parallel top and bottom of the trapezoids being in contact with and diffusion bonded to the face sheets.

* * * * *